(12) United States Patent
Antipa et al.

(10) Patent No.: US 9,858,027 B2
(45) Date of Patent: Jan. 2, 2018

(54) MULTIPLE DISPLAY RENDERING OF DIGITAL CONTENT

(71) Applicant: Adobe Systems Incorporated, San Jose, CA (US)

(72) Inventors: Damien Antipa, Saint-Louis (FR); Alexandre Capt, Landser (FR); Tobias Bocanegra, San Francisco, CA (US); Ondrej Florian, Allschwil (CH)

(73) Assignee: Adobe Systems Incorporated, San Jose, CA (US)

( * ) Notice: Subject to any disclaimer, the term of this patent is extended or adjusted under 35 U.S.C. 154(b) by 79 days.

(21) Appl. No.: 14/527,931

(22) Filed: Oct. 30, 2014

(65) Prior Publication Data

US 2016/0125778 A1 May 5, 2016

(51) Int. Cl.
*G09G 5/00* (2006.01)
*G06F 3/14* (2006.01)

(52) U.S. Cl.
CPC ....... *G06F 3/1446* (2013.01); *G09G 2354/00* (2013.01); *G09G 2356/00* (2013.01); *G09G 2370/042* (2013.01)

(58) Field of Classification Search
None
See application file for complete search history.

(56) References Cited

U.S. PATENT DOCUMENTS

| 7,487,447 B1* | 2/2009 | Jerger | G06F 3/0481 |
| | | | 715/252 |
| 8,751,970 B2 | 6/2014 | Hinckley et al. | |
| 2003/0101235 A1* | 5/2003 | Zhang | H04L 51/04 |
| | | | 709/218 |
| 2009/0228784 A1* | 9/2009 | Drieu | G06F 17/214 |
| | | | 715/235 |
| 2010/0248788 A1* | 9/2010 | Yook | G06F 3/0481 |
| | | | 455/566 |

(Continued)

FOREIGN PATENT DOCUMENTS

EP 2720141 A1 4/2014

OTHER PUBLICATIONS

Combined Search and Examination Report under Sections 17 & 18(3), UK Patent Application GB1512820.0 (Jan. 15, 2016).

*Primary Examiner* — Kyle Zhai
(74) *Attorney, Agent, or Firm* — Finch & Maloney PLLC

(57) ABSTRACT

Techniques are provided for segmenting digital content into a plurality of tiles which can be displayed across multiple application windows. For example, in one specific implementation, the methods disclosed herein can be used to segment a webpage into a plurality of tiles, wherein each of the tiles can be displayed in a separate web browser that displays a portion of the original webpage. In general, each content browser identifies which tile it displays based on a configuration that can be stored locally by the browser. To maintain interactivity such as may be provided by active content, each browser includes a mutation observer configured to detect changes in a document object model (DOM) and/or cascading style sheet (CSS) associated with the displayed content. Detected changes are recorded in notification messages which can be broadcast to other content browsers via a WebSocket connection or a direct peer-to-peer network.

20 Claims, 6 Drawing Sheets

(56) References Cited

U.S. PATENT DOCUMENTS

| | | | | |
|---|---|---|---|---|
| 2011/0216064 A1* | 9/2011 | Dahl | ................ | G06F 1/1616 345/428 |
| 2012/0081267 A1 | 4/2012 | Sirpal et al. | | |
| 2013/0002568 A1* | 1/2013 | Selim | ................ | G06F 1/1616 345/173 |
| 2013/0076591 A1 | 3/2013 | Sirpal et al. | | |
| 2013/0080936 A1* | 3/2013 | Reeves | ................ | G06F 3/1438 715/761 |
| 2013/0176255 A1* | 7/2013 | Kim | ................ | G06F 3/1423 345/173 |
| 2014/0104139 A1 | 4/2014 | Buchner | | |
| 2014/0132833 A1 | 5/2014 | Wang et al. | | |

\* cited by examiner

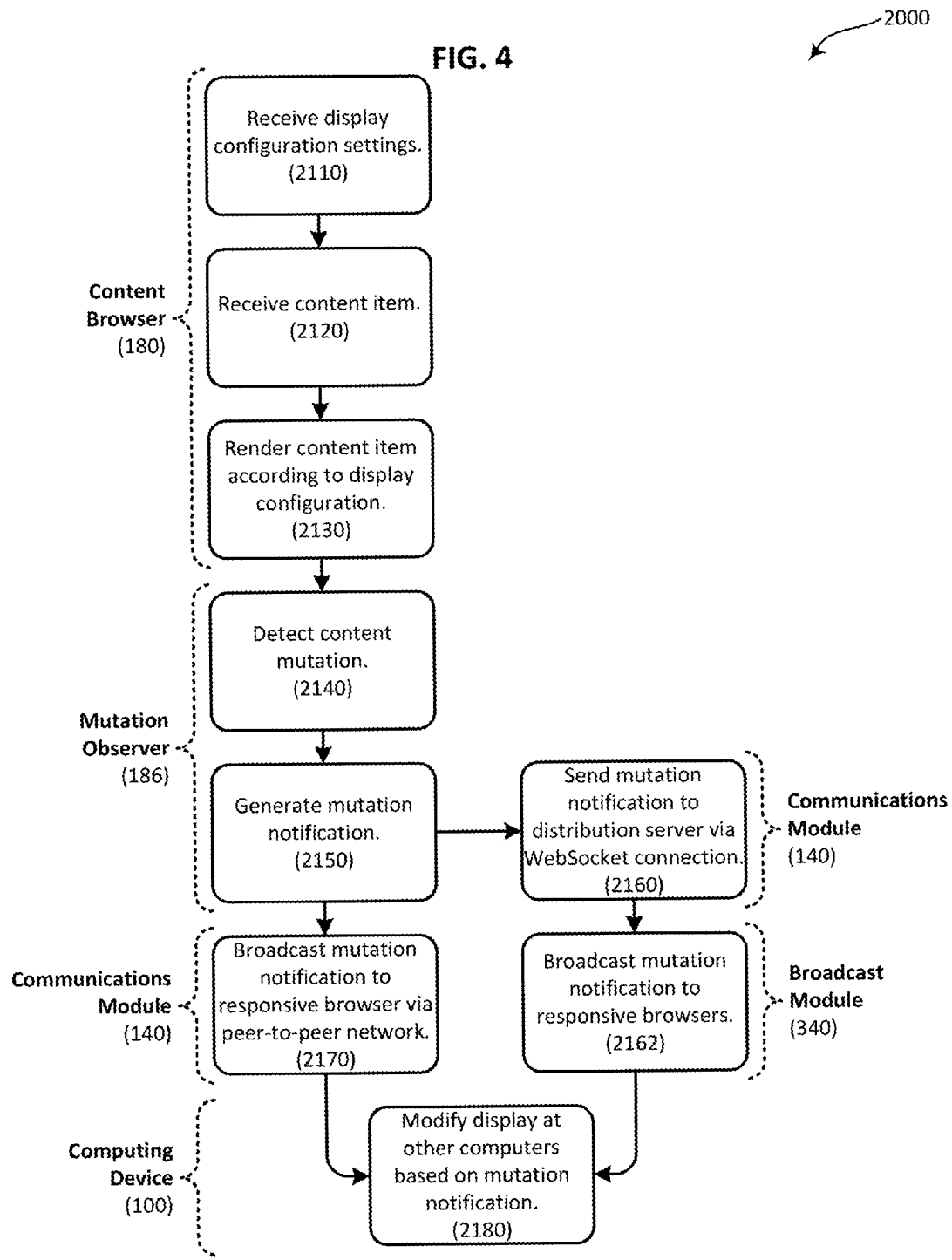

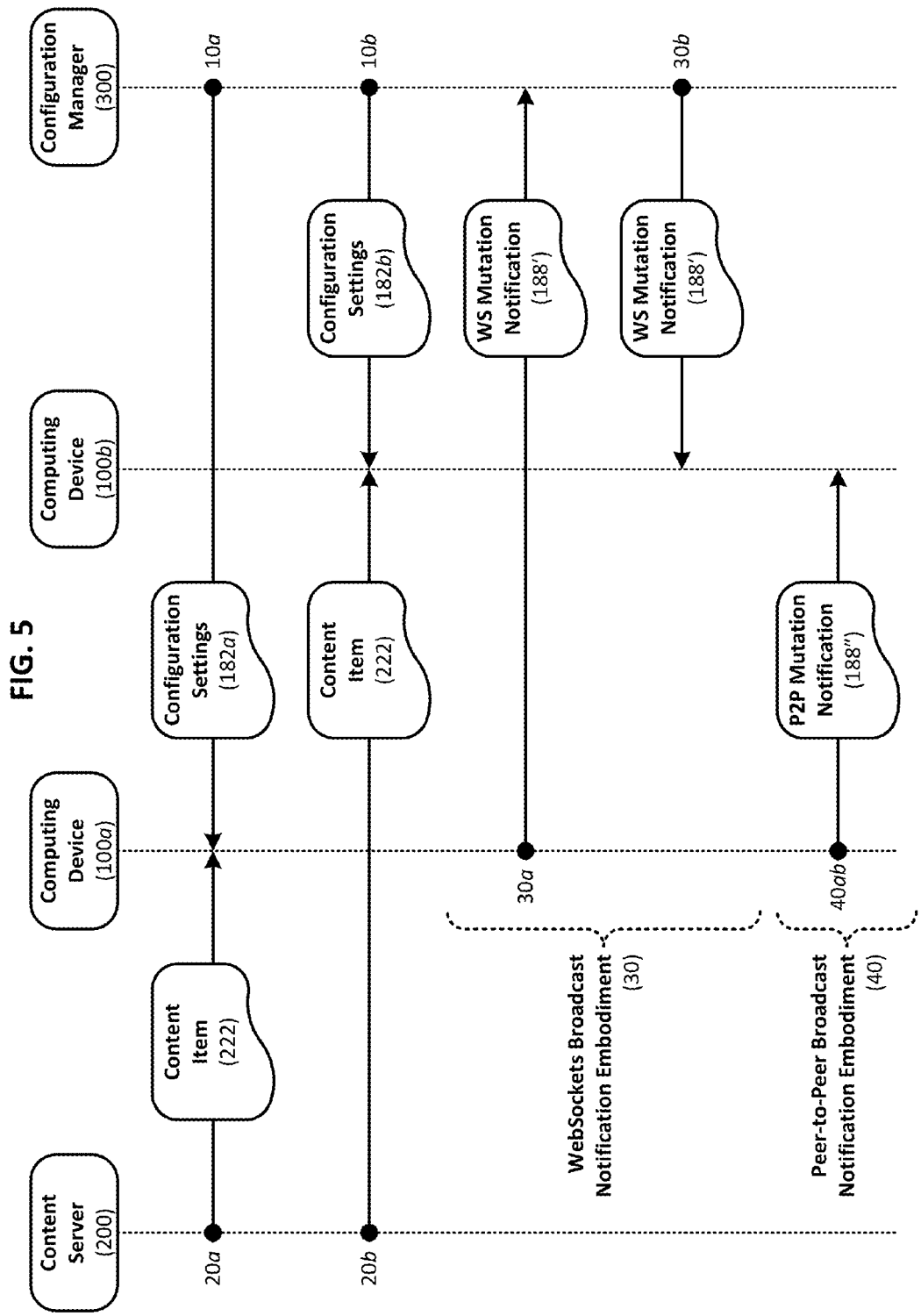

MULTIPLE DISPLAY RENDERING OF DIGITAL CONTENT

FIELD OF THE DISCLOSURE

This disclosure relates generally to the visual rendering of digital content, and more specifically to methods for segmenting digital content into a plurality of tiles which can be displayed across multiple application windows.

BACKGROUND

Large electronic display screens are used in a wide range of applications to display a correspondingly wide range of digital content. For example, stadiums and arenas often feature massive display screens that are used to present video images, photographs, and other information to tens of thousands of spectators. Display screens frequently form part of advertising displays which are installed in storefront windows, convention halls, and other locations where consumers may be present. Display screens are also often incorporated into information kiosks, interactive terminals, and similar devices that are installed in airports, train stations, amusement parks, and other places where people tend to congregate. Large size displays are particularly useful in applications such as these because they are easily visible by crowds, are capable of drawing attention from a distance, and can display large amounts of information. A wide range of technologies have been used to implement such displays, including projection displays and flat panel arrays of liquid crystal display (LCD) or light emitting diode (LED) elements. For example, a large display can be created by using a computer or other electronic device to control multiple individual displays which are physically arranged into a matrix, such as a 3×3 array of LED televisions positioned adjacent to each other. This technique can be replicated on a smaller scale by arranging a plurality of smaller devices, such as tablet computers, into an array. Regardless of the implementing technology, such composite display systems are often used with a controller that includes programming and electronics that are capable of simultaneously driving all of the displays in a coordinated fashion.

BRIEF DESCRIPTION OF THE DRAWINGS

FIG. 4 is a flowchart illustrating an example method of segmenting a digital content item into a plurality of tiles which are displayed across multiple application windows.

FIG. 5 is a data flow diagram schematically illustrating example data flows that occur when a digital content item is segmented into a plurality of tiles which are displayed across multiple application windows.

DETAILED DESCRIPTION

Figure 1A:
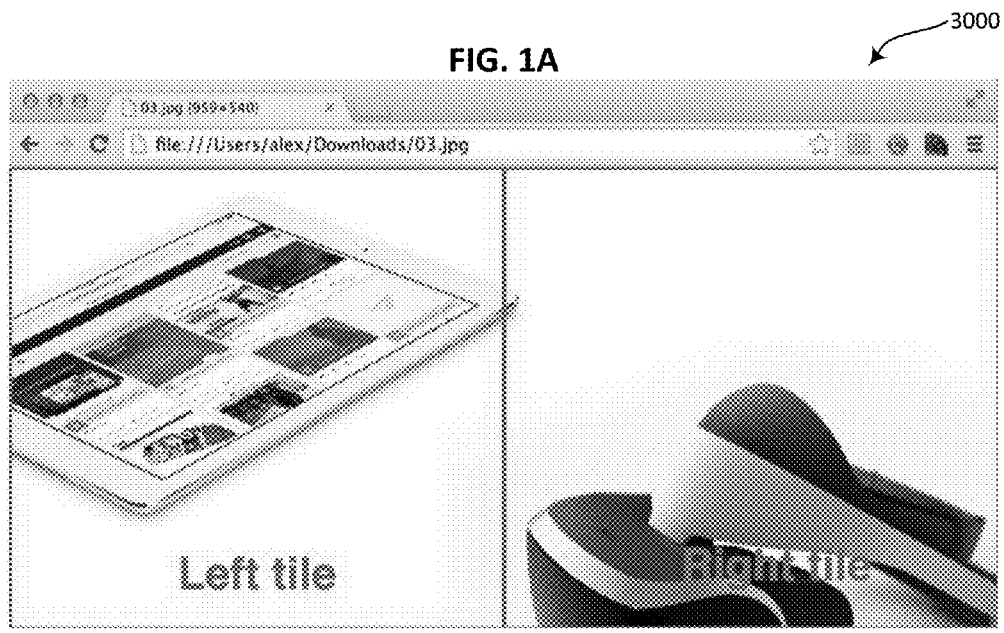
FIG. 1A is a screenshot illustrating digital content that is displayed in an application window that is conceptually segmented into multiple tiles.

Large electronic display screens often comprise a plurality of smaller flat screen displays positioned adjacent to each other, for example to form an array. When multiple display screens are arranged in this way, the resulting larger display device array is often referred to as a composite display or a multi-panel display. Composite displays have become increasingly popular as display technology has improved, as individual display border size has decreased, and as display cost has decreased. For example, the increased versatility of tablet computers, handheld computers, and other portable devices have made it possible to construct composite displays on a smaller scale using such devices. However, despite their popularity, existing composite displays nevertheless suffer from a number of shortcomings, partly because such displays often rely on a proprietary control system that is designed for use with a particular display configuration and/or particular display hardware. This makes it difficult for users to assemble their own customized composite displays having a unique size or shape, or using devices for which a composite display control system is unavailable. More fundamentally, many existing composite display control systems operate using a screen-based logic that relies on dividing a larger screen area into smaller segments. This approach is not easily adapted to page-based digital content, such as webpages, which have become ubiquitous in contemporary computing environments. For example, existing display segmentation systems lack the ability to robustly extend the interactive nature of web content to a composite display environment. These shortcomings translate into a substantial impediment to developers seeking to extend the functionality and market penetration of composite display systems.

Thus, and in accordance with certain of the embodiments disclosed herein, techniques are provided for segmenting digital content into a plurality of tiles which can be displayed across multiple application windows. For example, in one specific implementation, the methods disclosed herein can be used to segment a webpage into a plurality of tiles, wherein each of the tiles can be displayed in a separate web browser that displays a portion of the original webpage. In general, each content browser identifies which tile it displays based on a configuration that can be stored locally by the browser. To maintain interactivity such as may be provided by active content, each browser includes a mutation observer configured to detect changes in a document object model (DOM) and/or cascading style sheet (CSS) associated with the displayed content. Detected changes are recorded in notification messages which can be broadcast to other content browsers via a WebSocket connection or a direct peer-to-peer network. This approach advantageously allows page-based content to be displayed using a composite display without the use of a proprietary control system, thereby making it easy to manipulate the size and shape of the composite display, and to implement the display using a wide range of different display devices.

As used herein, the term "content" refers, in addition to its ordinary meaning, to information intended for direct or indirect consumption by a user. For example, the term content encompasses information directly consumed by a user such as when it is displayed on a display device, rendered using a content browser, or printed on a piece of paper. The term content also includes information that is not specifically intended for display and therefore also encompasses items such as software, executable instructions, scripts, hyperlinks, addresses, pointers, metadata, and formatting information. For example, a webpage may be understood as a content item that consists of a plurality of other content items such as images, text, hyperlinks, formatting instructions, and metadata. The use of the term content is independent of (a) how the content is presented to the user for consumption and (b) the software application used to create or render the content. Content may be encoded using one or more compression algorithms intended to reduce the amount of bandwidth required for transmission of the content via a network. Content may also be characterized as comprising "content items" or "assets". The terms "digital content" and "digital assets" refer to content which is encoded in binary digits (for example, zeroes and ones). Thus in the context of applications involving digital computers, the terms "content", "digital content", "assets", and "digital assets" are often used interchangeably.

As used herein, the terms "browser" and "content browser" refer, in addition to their ordinary meanings, to software applications that are capable of retrieving and rendering digital content obtained from a storage resource. Content which is to be browsed can be identified by a network address that is input by a user or that is selected from previously rendered content in the form of a hyperlink. A browser may include both user interface elements that provide access to functionality associated with content consumption (such as scroll bars, menu bars, toolbars, and the like), as well as a browser window in which the rendered content appears. It will be appreciated that a browser window may or may not include a visible border. Browsers can be configured to render content stored according to a wide variety of file formats and protocols. The functionality provided by a content browser can be extended through the use of plugins and/or extensions which can be configured to, for example, establish a WebSocket connection that allows content to be actively pushed between connected devices. A "web browser" is a class of browser that is specifically configured for retrieving and rendering digital content that is accessible via the World Wide Web (WWW), such as webpages, although many web browsers are also capable of accessing information provided by content servers in private networks and by file servers in a range of different file systems.

As used herein, the term "display" refers, in addition to its ordinary meaning, to a device that is capable of visually rendering content. Display devices can be implemented using a wide range of technologies, including projection displays, flat panel arrays of LCD or LED elements, and flat panel plasma displays. Displays can also be implemented using a touch sensitive surface, thereby resulting in a display which can function as both an input and output device. A "composite" or "multi-panel" display is produced by arranging a plurality of display devices adjacent to each other, thereby resulting in a larger display having user-defined dimensions and/or shape. While composite displays often have a rectangular shape, it will be appreciated that, in general, essentially any shape or size can be used for a composite device, and thus in certain embodiments a composite display may have an irregular and/or asymmetric shape such as an L-shape or an O-shape with a hollow central region. A composite display may comprise any suitable quantity of display devices. In some cases a composite display may comprise displays having different sizes and/or shapes such that, for example, a relatively wider display extends across the combined width of two or more relatively narrower displays.

Figure 1B:
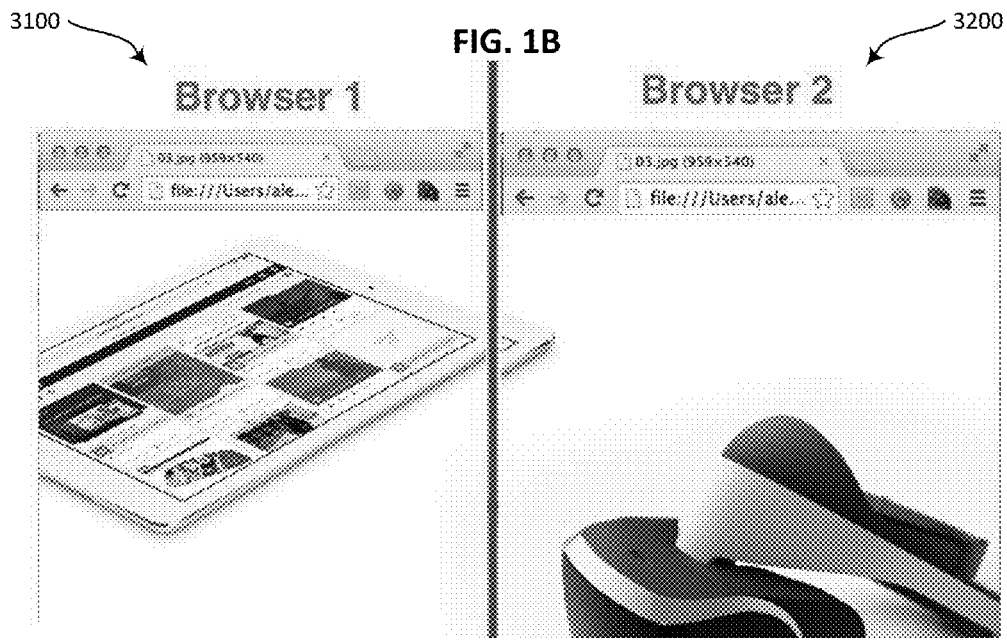
FIG. 1B is a screenshot illustrating the digital content of FIG. 1A, wherein such content is displayed across multiple application windows.

As used herein, the term "tile" refers, in addition to its ordinary meaning, to a conceptual sub-region of a content item or a sub-region of a composite display in which at least a portion of the content item is rendered. For example, a content browser can be understood as including a browser window which can be conceptually subdivided into a left tile and a right tile. Portions of rendered content which appear in the left tile can be configured to appear in a first (leftward) panel of a composite display, while portions of the rendered content which appear in the right tile can be configured to appear in a second (rightward) panel of a composite display. It will be appreciated that, in general, tiles are conceptual elements that can be configured to have a user-defined shape and size. For example, FIG. 1A is a screenshot illustrating digital content that is displayed in a browser window 3000 that is conceptually segmented into multiple tiles, while FIG. 1B illustrates this same content displayed across a first browser window 3100 corresponding to the first tile and a second browser window 3200 corresponding to the second tile. A tile may also be referred to as a "viewport".

System Architecture

Figure 2:
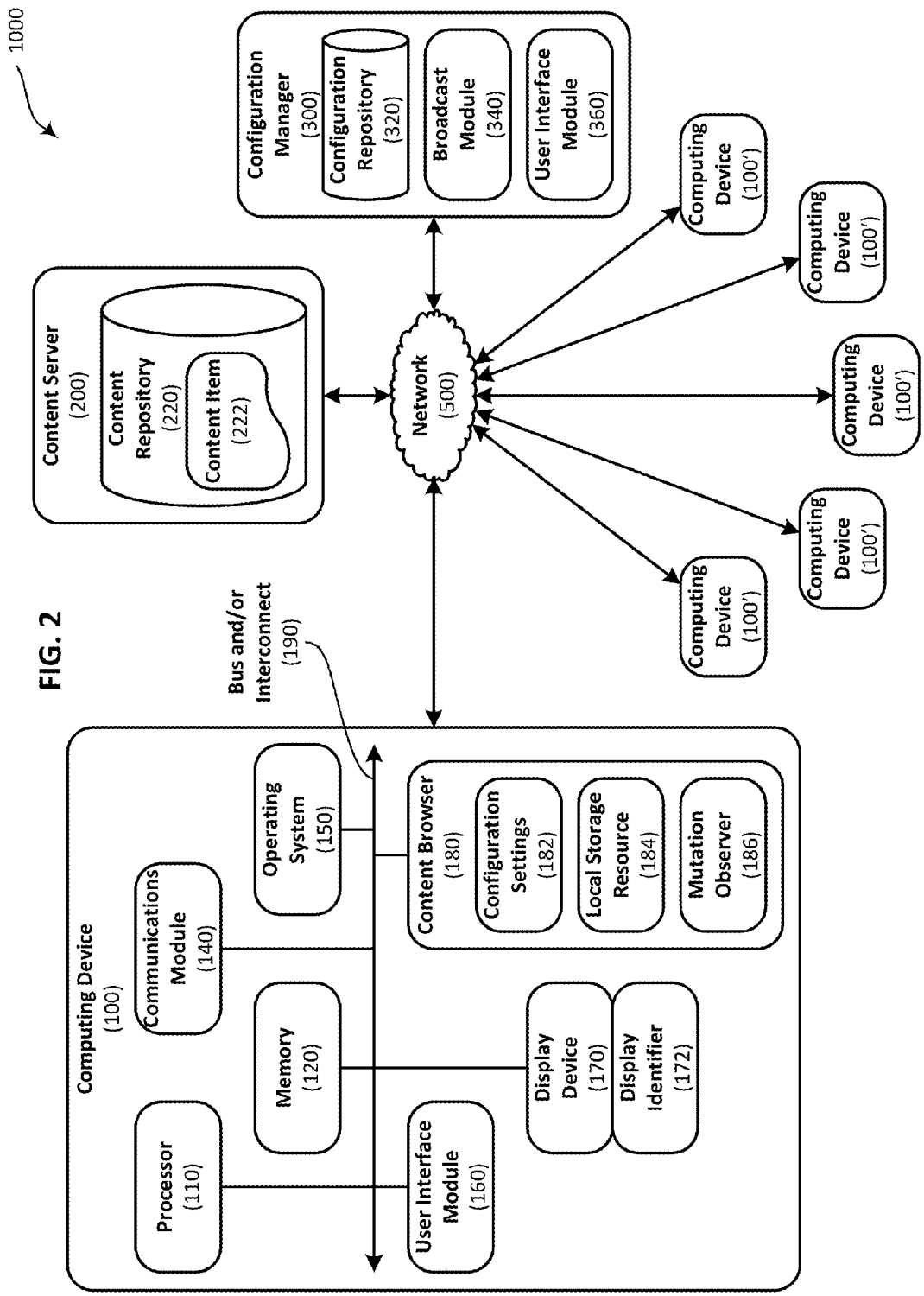
FIG. 2 is a block diagram schematically illustrating selected components of a networked computer system that can be used to implement certain of the embodiments disclosed herein.

FIG. 2 is a block diagram schematically illustrating selected components of a networked computer system 1000 that can be used to implement certain of the embodiments disclosed herein. As illustrated, networked computer system 1000 comprises one or more computing devices 100, and may also include a content server 200 and/or a configuration manager 300. Computing device 100, and optionally content server 200 and/or configuration manger 300, can be configured to communicate with each other via a network 500. The architecture and functionality of the various components and subcomponents comprising networked computer system 1000 will be described in turn. However, in general, it will be appreciated that such embodiments provide techniques for segmenting digital content into a plurality of tiles which can be displayed across multiple application windows. Because the particular resources, components, and functionality provided in a given implementation may be specifically tailored to the demands of a particular application, this disclosure is not intended to be limited to provision or exclusion of any particular resources, components, or functionality.

Figure 3:
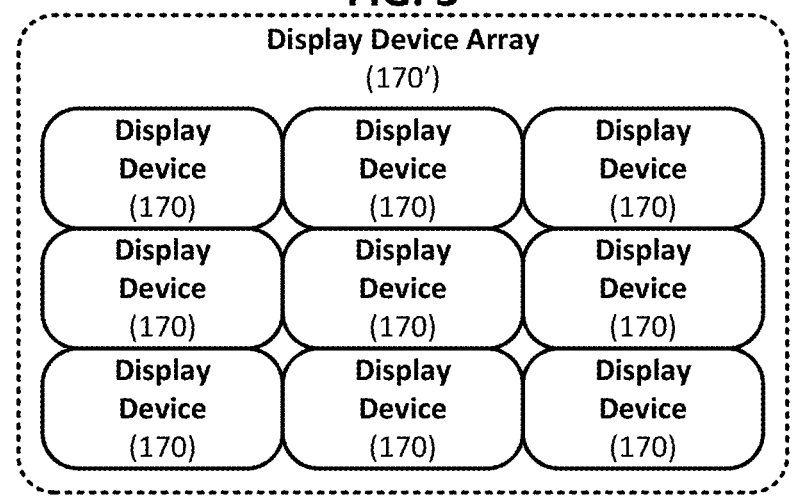
FIG. 3 is a block diagram schematically illustrating an example embodiment of a composite display device array comprising a plurality of touch sensitive display devices.

Computing device 100 comprises, for example, a device selected from a desktop computer, a laptop computer, a workstation, a tablet computer, a smartphone, a handheld computer, a set-top box, or another suitable computing device. A combination of different types of computing devices can be used in certain embodiments. Computing device 100 is associated with a display device 170, such as a touch sensitive display device. In general, display device 170 can be implemented using a wide range of technologies, including projection displays, flat panel arrays of LCD or LED elements, and flat panel plasma displays. Display device 170 may or may not include a touch sensitive surface. In embodiments wherein networked computer system 1000 includes a plurality of computing devices 100, such as in the example embodiment illustrated in FIG. 2 where networked computer system 1000 includes a plurality of additional computing devices 100', a corresponding plurality of display devices 170 can be implemented using different technologies. In some embodiments a single computing device can be associated with multiple display devices, in other embodiments each one of a plurality of computing devices is associated with a single display device, and in still other embodiments a combination of the foregoing configurations is used. Each display device 170 is associated with a unique display identifier 172. A plurality of display devices 170 can be arranged to form a composite display device array 170' having a user-defined size and shape, as disclosed herein, and as illustrated in FIG. 3.

Referring again to FIG. 2, computing device 100 includes, among other things, a processor 110, a memory 120, a communications module 140, an operating system 150, a user interface module 160, and a content browser 180. A bus and/or interconnect 190 is also provided to allow for inter- and intra-device communications using, for example, communications module 140. Other componentry and functionality not reflected in the schematic block diagram of FIG. 2 will be readily apparent in light of this disclosure, and it will be appreciated that the claimed invention is not intended to be limited to any specific architecture or hardware configuration. For instance, in embodiments that include a plurality of additional computing devices 100', one or more of the additional computing devices 100' may have a different system architecture than that illustrated in FIG. 2 for computing device 100. Therefore while example subcomponents associated with computing device 100 are illustrated in FIG. 2, the plurality of additional computing devices 100' are illustrated generically given that such devices may have a different architecture.

Processor 110 can be implemented using any suitable processor, and may include one or more coprocessors or controllers, such as a graphics processing unit or an audio processor, to assist in control and processing operations associated with computing system 100. Likewise, memory 120 can be implemented using any suitable type of digital storage, such as one or more of a disk drive, a universal serial bus (USB) drive, flash memory, random access memory, or any suitable combination of the foregoing. Memory 120 can be used, for example, to store display configuration information and/or notification messages that are used to control the appearance of content on display device 170. Communications module 140 can be implemented using any appropriate network chip or chipset which allows for wired or wireless connection to network 500 and/or other computing devices and resources. Network 500 may be a local area network (such as a home-based or office network), a wide area network (such as the Internet), or a combination of such networks, whether public, private, or both. In some cases access to resources on a given network or computing system may require credentials such as usernames, passwords, or any other suitable security mechanism.

Operating system 150 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computing device 100, and therefore may also be implemented using any suitable existing or subsequently-developed platform. In one embodiment operating system 150 manages one or more device drivers which are used to control operation of hardware such as display device 170. Operating system 150 can also be configured to provide functionality and services that support, for example, user interface module 160, content browser 180, and other applications running on computing device 100.

User interface module 160 provides a user interface that can be used to configure various subcomponents associated with networked computer system 1000, such as one or more content browsers 180 and one or more display devices 170. In particular, user interface module 160 can be used to configure how content browser 180 renders received content, and in particular, to define what spatial portion of received content should be displayed in a browser window generated by content browser 180. This configuration may depend, for example, on the position of the corresponding display device 170 in composite display device array 170'. In one embodiment a particular computing device 100 is capable of configuring only subcomponents associated with that particular device. However in an alternative embodiment the particular computing device 100 is capable of configuring subcomponents associated with the plurality of additional computing devices 100' as well.

In general, content browser 180 can be understood as comprising a software application that is capable of retrieving and rendering digital content obtained from a storage resource, such as a content repository 220 hosted by content server 200. In one particular embodiment content browser 180 is a web browser capable of rendering content encoded and transmitted using a Hypertext Markup Language (HTML) protocol. Examples of such protocols include HTML5, WebSockets, and Web Real-Time Communication (Web RTC). In another embodiment, content browser 180 is selected from a group consisting of a web browser, an electronic mail reader, a newsreader, a word processing application, and an ecommerce storefront application. Other types of software applications can be used to retrieve and render content in other embodiments. It will be appreciated that the embodiments disclosed herein are configured to work with a wide variety of existing and subsequently developed content browsers. For example, while FIG. 1 indicates that computing device 100 has executing thereon a single content browser, in alternative embodiments multiple content browsers may run simultaneously on computing device. Such an implementation may be advantageous where computing device 100 is also associated with multiple display devices since each of the multiple display devices can be associated with one of the multiple content browsers.

In certain embodiments content browser 180 includes configuration settings 182 which are stored in a local storage resource 184 that is managed by content browser 180. In alternative embodiments configuration settings 182 can be stored in a different location, such as in memory 120. Regardless of their storage location, configuration settings 182 can be understood as defining a conceptual sub-region—often referred to as a viewport or a tile—of a received digital content item, wherein the conceptual sub-region should be displayed in a browser window that is generated by content browser 180. The viewport definition may depend, for example, on the position of an associated display device 170 in composite display device array 170'. In one embodiment configuration settings 182 define a single tile that is to be displayed in the corresponding browser window, while in other embodiments configuration settings 182 define multiple tiles that can be simultaneously displayed in different regions of a single browser window, such as in different browser window frames.

FIGS. 1A and 1B conceptually illustrate how configuration settings 182 can be used to define a conceptual sub-region of a digital content item such as a webpage. In particular, FIG. 1A is a screenshot illustrating a webpage that is displayed in browser window 3000, which is conceptually segmented into a left tile and a right tile. FIG. 1B is a screenshot illustrating the webpage of FIG. 1A, wherein a first portion of the webpage is displayed in first browser window 3100 corresponding to Browser 1, and wherein a second portion of the webpage is displayed in second browser window 3200 corresponding to Browser 2. In such an implementation, Browser 1 includes first configuration settings that define the size and position of the leftward tile illustrated in FIG. 1A, and therefore that define what portion of the webpage will appear in Browser 1. Likewise, Browser 2 includes second configuration settings that define the size and position of the rightward tile illustrated in FIG. 1A, and therefore that define what portion of the webpage will appear in Browser 2. In certain embodiments the size and position established in configuration settings 182 depends on the size and position of a display device on which the corresponding browser window is to be displayed. While only two tiles and two browser windows are illustrated in FIGS. 1A and 1B, in general any suitable quantity of configuration settings 182 can be established for corresponding content browsers that are displayed using corresponding display devices arranged into a composite display.

In certain embodiments content browser 180 further includes a mutation observer 186. Mutation observer 186 is configured to detect changes in the digital content that is rendered by content browser 180. In some cases such changes may occur in response to user interaction with the digital content, for example by a user scrolling within displayed content or interacting with active content. In other cases such changes may occur independent of any user action, such as by virtue of the passage of time, the playing of an animation sequence, or the detection of some external event. Regardless of the cause of the changes, in such embodiments mutation observer 186 is configured to detect changes in a DOM and/or CSS associated with the digital content. Mutation observer 186 can also be configured to record the detected changes in one or more notification messages which can be transmitted to other content browsers via a WebSocket connection or a direct peer-to-peer network. Therefore changes detected at one content browser can be communicated to other content browsers which may not have detected such changes in order to partially or fully synchronize the appearance of the display.

Referring still to the example embodiment illustrated in FIG. 2, networked computer system 1000 optionally includes content server 200. Content server 200 hosts content repository 220 in which one or more content items 222 are stored. In such embodiments content server 200 can be understood as comprising one or more enterprise class devices configured to host content and deliver the hosted content to one or more computing devices 100. While only one content server 200 is illustrated in FIG. 2, it will be appreciated that, in general, tens, hundreds, thousands, or more networked content servers 200 can provide content hosting and delivery functionality. In still other embodiments content server 200 is omitted altogether, and the content items are stored locally in memory 120 provided by computing device 100, and are transmitted to additional computing devices 100' via a peer-to-peer network.

Networked computer system 1000 also optionally includes configuration manager 300, which can be configured to generate and/or manage a plurality of configuration settings 182 associated with a corresponding plurality of content browsers 180 and display devices 170. In such embodiments configuration manager 300 provides a user interface module 360 that can be used to define the characteristics of composite display device array 170', and in particular the various sizes and positions of the individual display devices 170 comprising array 170'. Based on input received via user interface module 360, configuration manger 300 generates configuration settings 182 which are distributed to a plurality of computing devices 100, and in particular to a plurality of content browsers 180. Configuration settings 182 are also optionally stored in a configuration repository 320 hoisted by configuration manager 300. While each content browser 180 can be configured individually, use of configuration manger 300 facilitates setup of array 170' by enabling all or nearly all configuration to occur via a single user interface.

In one embodiment the functionality associated with configuration manager 300 can be provided by a computing device that is also used to control one of the display devices used to render digital content. In an alternative embodiment the configuration functionality is provided by a dedicated computing device that does not control one of the display devices used to render digital content. For example, in one such alternative embodiment configuration manager 300 comprises a desktop computer, a laptop computer, a workstation, a tablet computer, a smartphone, a handheld computer, a set-top box, an enterprise class server device, or another suitable computing device configured to provide the functionality described herein as being associated with configuration manager 300. Configuration manager 300 also optionally includes a broadcast module 340 capable of transmitting the aforementioned notification messages generated by mutation observer 186 to additional computing devices 100'.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the digital content rendering methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as operating systems, device configuration managers, presentation applications, web browsers, and other applications capable of rendering HTML content. For example, a web browser can be configured to include a multi-screen mode wherein rendered content is segmented and displayed in separate windows appearing on separate display screens. Or in another embodiment an operating system is configured to provide functionality associated with configuration manager 300, such that when a web browser is invoked, or when HTML content is rendered, such content can be segmented based on a user-defined configuration associated with a composite display. Thus in some implementations the functionality described herein can be provided on an individual application basis, while in other implementations such functionality can be provided by an operating system to a range of applications that leverage resources and/or device configurations provided by the operating system. The computer systems disclosed herein may include a number of different modules, sub-modules, or other components of distinct functionality, and can provide information to, or receive information from, still other components and services. These modules can be used, for example, to communicate with additional computing devices 100', content server 200, configuration manager 300, or other external components. Other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with software, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology

FIG. 4 is a flowchart illustrating an example digital content rendering method 2000 that is capable of segmenting digital content into a plurality of tiles which are displayed across multiple application windows. FIG. 5 is a data flow diagram schematically illustrating example data flows that occur when digital content is segmented into a plurality of tiles which are displayed across multiple application windows. As can be seen, digital content rendering method 2000 includes a number of phases and sub-processes, the sequence of which may vary from one embodiment to another. However, when considered in the aggregate, these phases and sub-processes form a complete digital content rendering process that is responsive to user input in accordance with certain of the embodiments disclosed herein. These methodologies can be implemented, for example, using the system architecture illustrated in FIG. 2. However other system architectures can be used in other embodiments, as will be apparent in light of this disclosure. To this end, the correlation of the various functionalities shown in FIGS. 4 and 5 to the specific components illustrated in FIG. 2 is not intended to imply any structural and/or use limitations. Rather other embodiments may include varying degrees of integration where multiple functionalities are performed by one system or by separate systems. For instance, in an alternative embodiment the functionality associated with configuration manager 300 can be incorporated into computing device 100. Thus other embodiments may have fewer or more modules and sub-modules depending on the granularity of implementation. Numerous variations and alternative configurations will be apparent in light of this disclosure.

Still referring to FIGS. 4 and 5, the example digital content rendering method 2000 commences with each of a plurality of content browsers receiving display configuration settings. See reference numeral 2110 in FIG. 4. The display configuration settings can be received from one or more of a number of different sources, such as from a memory resource local to the computing device where content browser is running, from user input received via a user interface module provided by the computing device where content browser is running, or from an external configuration manager. FIG. 5 illustrates an example embodiment wherein configuration manager 300 transmits different display configuration settings to different computing devices. Configuration manager 300 may obtain the configuration settings via user interface module 360 and cache the configuration settings in configuration repository 320, as illustrated in FIG. 2. Configuration manager 300 transmits first configuration settings 182*a* to a first computing device 100*a* in a first transmission 10*a*, and transmits second configuration settings 182*b* to a second computing device 100*b* in a second transmission 10*b*. In such embodiments configuration repository 320 can correlate each collection of configuration settings 182*a*, 182*b* with a display identifier that identifies the particular display device (and therefore computing device 100*a*, 100*b*) to which the configuration settings should be sent. As described herein, configuration settings can generally be understood as defining a viewport or tile that can be applied to a digital content item that is to be displayed by a particular content browser. In such embodiments the tile configuration depends on the size and location of a particular display device that forms part of a composite display.

Digital content rendering method 2000 additionally or alternatively commences with each of the plurality of content browsers receiving a common content item. See reference numeral 2120 in FIG. 4. In one embodiment the content item is transmitted from a content server, while in alternative embodiments the content item is received from one or more other sources, or is retrieved from a memory resource that is local to the computing device wherein content browser is running FIG. 5 illustrates an example embodiment where content server 200 transmits a content item 222 to first computing device 100*a* in a first transmission 20*a*, and transmits the same content item 222 to second computing device 100*b* in a second transmission 20*b*. In an alternative embodiment content server 200 transmits content item 222 to first and second computing devices 100*a*, 100*b* simultaneously via a broadcast transmission. While FIG. 4 indicates that in certain embodiments the display configuration settings are received before the content item is received, it will be appreciated that, in general, the order of such data transmissions is not critical, and may occur in other sequences or simultaneously in other embodiments.

Once a plurality of content browsers have received the common content item and the browser-specific configuration settings, the content item can be rendered at each browser according to the corresponding configuration settings. See reference numeral 2130 in FIG. 4. For instance, in the example embodiment illustrated in FIG. 5, computing device 100*a* would render content item 222 according to configuration settings 182*a*, while computing device 100*b* would render content item 222 according to configuration settings 182*b*. In particular, when a content browser loads HTML content, the viewport of the browser window can be adapted to correspond to the viewport specified in the received configuration settings. This can be accomplished, for example, using CSS translations. As a result, although the content browser loads the entire content item, only a portion of the loaded content item is visible in the browser window. In general, because the configuration settings define a tile having a size and location tailored to a particular display device that forms part of a composite display, the result is a unified appearance of the content item across multiple browser windows, optionally displayed on multiple display devices, for example as illustrated in FIG. 1B.

It is possible that the content item will be modified after it is rendered in the multiple content browser windows. Such modifications may occur in response to user interaction with the digital content, for example by a user scrolling or otherwise interacting with active content. This is particularly likely where the display devices comprising a composite display include a touch sensitive surface. However, even without touch sensitive displays, content modifications may occur independent of any user action, such as by virtue of the passage of time, the presence of animation objects, or the detection of some external event. Regardless of the cause, such modifications may be detected at only a few of the content browsers. For example, if a user attempts to scroll through a webpage by making a swiping gesture on one of multiple touch sensitive display devices that comprise a composite display, that gesture might be detected only at the one display device with which the user interacted. However the modified content appearance as a result of the scrolling should likely be reflected on multiple display devices. As a result, certain of the embodiments disclosed herein include techniques for detecting content modifications and propagating such modifications from a content browser where such modification is detected (referred to herein as the "detecting browser") to other content browsers where such changes should be reflected (referred to herein as the "responsive browsers"). This allows synchronous access to the content item to be simulated.

In accordance with the foregoing, in certain embodiments each content browser includes a mutation observer that is configured to detect modifications in the content that is rendered by the content browser. See reference numeral 2140 in FIG. 4. For example, the mutation observer can be configured to observe the DOM that defines the structure of the content item. Elements in the DOM which are modified can be annotated using data attributes which uniquely identify the modified element, for example using a uniform resource locator (URL) associated with the modified element. Thus, for example, if a DOM element is modified or removed as a result of user interaction with the content item, the mutation observer can be configured to identify the modified or removed element. The mutation observer can also be configured to detect changes in the computed style of DOM elements, and in such embodiments is therefore also responsive to CSS changes in the rendered content. One example of an event which may cause changes in the computed style is user interaction with a scroll panel object which would not necessarily change its subsidies, but which may result in modified computed style attributes. Where the change in the style attribute is a transition from one state to another, a loop that requests and renders a plurality of animation frames can be executed until the animation ends. This enables the multiple content browsers to render intermediate states of the animation.

Figure 6A:
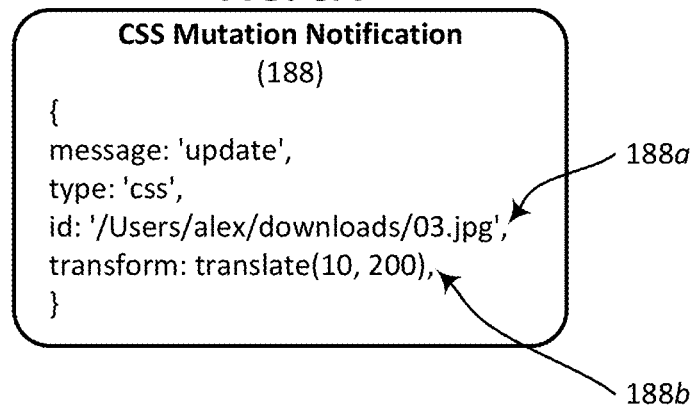
FIG. 6A illustrates an example cascading style sheet mutation notification message that is transmitted from a detecting browser to one or more responsive browsers.
Figure 6B:
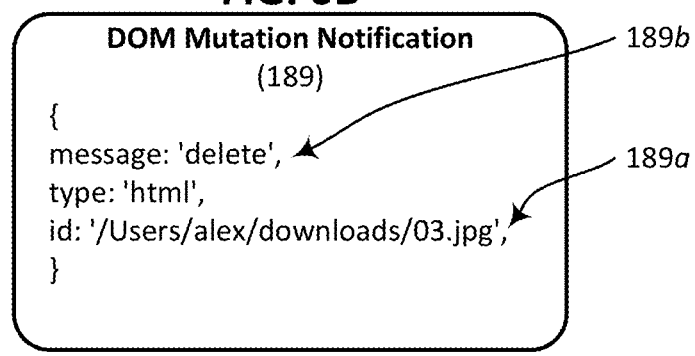
FIG. 6B illustrates an example document object model mutation notification message that is transmitted from a detecting browser to one or more responsive browsers.

Once a content modification is identified, mutation observer can be further configured to generate a notification message that is to be sent from the detecting browser to one or more responsive browsers. See reference numeral 2150 in FIG. 4. In one embodiment, such a notification identifies one or more changed elements and defines one or more corresponding modifications. FIG. 6A illustrates an example CSS mutation notification 188 that is transmitted from a detecting browser to one or more responsive browsers. As illustrated, CSS mutation notification 188 includes a first name-value pair 188*a* that identifies the changed element and a second name-value pair 188*b* that defines the modification that should be applied to that element. FIG. 6B illustrates an example DOM mutation notification 189 that is transmitted from a detecting browser to one or more responsive browsers. As illustrated, DOM mutation notification 189 includes a first name-value pair 189*a* that identifies the changed element and a second name-value pair 189*b* that defines the modification that should be applied to that element.

In general, mutation notifications are sent to the responsive browsers via a network connection that is fast enough to enable updates made at the responsive browsers to appear substantially simultaneously with each other and substantially simultaneously with updates at the detecting browser. Synchronous or asynchronous calls tend to be too slow for this purpose, and therefore in one embodiment communications module 140 is configured to transmit one or more mutation notifications to a distribution server via a WebSockets connection. See reference numeral 2160 in FIG. 4. The distribution server broadcasts the notifications to one or more responsive browsers. See reference numeral 2162 in FIG. 4. In one particular implementation, broadcast module 340 installed at configuration manager 300 acts as a distribution server for the mutation notifications, while in other implementations a dedicated distribution server is used in this regard. Such a WebSockets broadcast notification embodiment 30 is conceptually illustrated in FIG. 5, wherein a WebSockets mutation notification 188' is initially transmitted from computing device 100*a* (associated with a detecting browser) to configuration manager 300 in a first WebSockets transmission 30*a*, and is subsequently transmitted from configuration manager 300 to computing device 100*b* (associated with a responsive browser) in a second WebSockets transmission 30*b*.

In an alternative embodiment communications module 140 is configured to transmit one or more mutation notifications from detecting browser to one or more responsive browsers by establishing a peer-to-peer or socket connection between the browsers. See reference numeral 2170 in FIG. 4. Such a peer-to-peer broadcast notification embodiment 40 is also conceptually illustrated in FIG. 5, wherein a peer-to-peer mutation notification 188" is transmitted from computing device 100*a* (associated with a detecting browser) to computing device 100*b* (associated with a responsive browser) via a peer-to-peer connection. Regardless of how the mutation notifications are transmitted from the detecting browser to the one or more responsive browsers, the responsive browsers can be configured the modify the appearance of the content item based on the received mutation notification. See reference numeral 2180 in FIG. 4.

Conclusion

Numerous variations and configurations will be apparent in light of this disclosure. For instance, one example embodiment provides a method for rendering digital content. The method comprises running a content browser on a computing device. The content browser is configured to render a browser window on a display device that (a) is operably coupled to the computing device and (b) forms part of a composite display. The method further comprises receiving, by the content browser, a display configuration that defines a sub-region of the composite display that corresponds to the display device. The method further comprises receiving, by the content browser, a content item. The method further comprises rendering a portion of the content item in the browser window. The portion of the content item that is rendered corresponds to the sub-region of the composite display. In some cases the display configuration is received via user input provided in the browser window. In some cases the display configuration is received from a configuration manager via a network connection. In some cases the method further comprises running a second content browser on the computing device. The second content browser is configured to render a second browser window on a second display device that forms part of the composite display. In some cases the content browser is a web browser and the content item is a webpage encoded using a hypertext markup language (HTML). In some cases the method further comprises (a) detecting a modification to an element that comprises the content item after the portion of the content item is rendered; and (b) generating a mutation notification that characterizes the modification and identifies the element to which the modification applies. In some cases the method further comprises (a) detecting a modification to a document object model that defines a structure of the content item; and (b) generating a mutation notification that characterizes the modification. In some cases the method further comprises (a) running a second content browser on a second computing device, wherein the second content browser is configured to render a second browser window on a second display device that also forms part of the composite display; (b) receiving, by the second content browser, a second display configuration that defines a second sub-region of the composite display; (c) receiving, by the second content browser, the content item; and (d) rendering a second portion of the content item in the second browser window, wherein the second portion of the content item corresponds to the second sub-region of the composite display.

Another example embodiment provides a system for rendering digital content. The system comprises a first content browser configured to render a first browser window on a first display device that forms part of a composite display. The first browser window displays a first tile of a content item that comprises one or more elements. The system further comprises a second content browser configured to render a second browser window on a second display device that forms part of the composite display. The second browser window displays a second tile of the content item. The system further comprises a mutation observer configured to detect a modification in the first tile of the content item and generate a mutation notification that characterizes the modification and identifies an element to which the modification is to be applied. The first content browser is further configured to send the mutation notification to the second content browser. The second content browser is further configured to modify an appearance of the second tile as displayed on the second display device based on the mutation notification. In some cases (a) the content item is a webpage encoded using a hypertext markup language; and (b) the modification in the first tile of the content item is a modification to a document object model that defines a structure of the content item. In some cases (a) the content item is a webpage; and (b) the first and second content browsers are configured to receive the webpage from a content server. In some cases (a) the first tile of the content item is defined by a display configuration; and (b) the first content browser is further configured to receive the display configuration from a configuration manager. In some cases the system further comprises a configuration manager configured to receive first and second display configurations that define the first and second tiles, respectively. In some cases (a) the content item is a webpage encoded using a hypertext markup language; and (b) the mutation notification defines a cascading style sheet (CSS) translation.

Another example embodiment provides a non-transitory computer readable medium having instructions encoded thereon that, when executed by one or more processors, causes a digital content rendering process to be carried out. The process comprises rendering a first browser window on a first display device that forms part of a composite display. The first browser window displays a first tile of a content item that comprises one or more elements. The process further comprises rendering a second browser window on a second display device that forms part of the composite display, wherein the second browser window displays a second tile of the content item. The process further comprises detecting, at the first browser window, a modification to one of the elements comprising the content item. The process further comprises generating, by a mutation observer, a mutation notification that characterizes the modification and identifies the element to which the modification applies. The process further comprises modifying an appearance of the content item in the second browser window in response to processing the mutation notification. In some cases the digital content rendering process further comprises (a) receiving, via the first browser window, a first display configuration that defines the first tile and a second display configuration that defines the second tile; and (b) transmitting the second display configuration to a content browser that renders the second browser window. In some cases the first display device includes a touch sensitive surface; and (b) detecting the modification further comprises detecting a scrolling gesture made using the touch sensitive surface. In some cases the digital content rendering process further comprises sending the mutation notification from a first computing device that is executing a first content browser that renders the first browser window to a second computing device that is executing a second content browser that renders the second browser window. In some cases (a) the digital content rendering process further comprises sending the mutation notification from a first computing device that is executing a first content browser that renders the first browser window to a second computing device that is executing a second content browser that renders the second browser window; and (b) the mutation notification is sent via a peer-to-peer communication. In some cases (a) the digital content rendering process further comprises sending the mutation notification from a first computing device that is executing a first content browser that renders the first browser window to a second computing device that is executing a second content browser that renders the second browser window; (b) the mutation notification is sent from the first computing device to a sever; and (c) the mutation notification is sent from the server to the second computing device.

The foregoing detailed description has been presented for purposes of illustration and description. It is not intended to be exhaustive or to limit the invention to the precise form described. Many modifications and variations are possible in light of this disclosure. It is intended that the scope of the invention be limited not by this detailed description, but rather by the claims appended hereto.

What is claimed is:

1. A method for rendering digital content, the method comprising:
   running a first content browser on a computing device, wherein the first content browser renders a first browser window on a first display device that (a) is operably coupled to the computing device and (b) forms part of a composite display;
   running a second content browser on the computing device, wherein the second content browser renders a second browser window on a second display device that (a) is operably coupled to the computing device and (b) forms part of the composite display;

receiving, by the computing device, a content item that is logically subdivided into a plurality of tiles, wherein a document object model defines a structural aspect of the content item;

rendering at least a portion of the content item using the composite display, wherein the first browser window rendered by the first content browser displays a first tile of the content item and wherein the second browser window rendered by the second content browser displays a second tile of the content item;

detecting, at the first browser window, a modification to the document object model that affects an appearance of the content item in the first tile;

generating, by a mutation observer executing on the first content browser, a mutation notification that characterizes the modification detected at the first browser window;

using the second content browser to process the mutation notification that was generated by the mutation observer executing on the first content browser; and modifying an appearance of the content item in the second tile in response to processing the mutation notification.

2. The method of claim 1, further comprising receiving, by the computing device, a display configuration that defines how the content item is logically subdivided into the plurality of tiles, wherein the display configuration is received via user input provided in the first browser window.

3. The method of claim 1, further comprising receiving, by the computing device, a display configuration that defines how the content item is logically subdivided into the plurality of tiles, wherein the display configuration is received from a configuration manager via a network connection.

4. The method of claim 1, further comprising running a third content browser on the computing device, wherein the third content browser renders a third browser window on a third display device that forms part of the composite display.

5. The method of claim 1, wherein the first content browser is a web browser and the content item is a webpage encoded using a hypertext markup language (HTML).

6. The method of claim 1, wherein the mutation notification further identifies the content item to which the modification applies.

7. The method of claim 1, wherein the mutation notification comprises a plurality of name-value pairs.

8. The method of claim 1, further comprising:
running a third content browser on the computing device, wherein the third content browser renders a third browser window on a third display device that forms part of the composite display, and wherein the third browser window displays a third tile of the content item; and
modifying an appearance of the content item in the third tile in response to processing the mutation notification.

9. A system for rendering digital content, the system comprising:
a memory device storing a content item that is logically subdivided into a plurality of tiles, wherein a document object model defines a structural aspect of the content item;
a first content browser that renders a first tile of the content item in a first browser window on a first display device that forms part of a composite display;
a second content browser that renders a second tile of the content item in a second browser window on a second display device that forms part of the composite display; and
a mutation observer, executing on the first content browser, that is configured to detect a modification to the document object model that affects an appearance of the content item in the first tile and generate a mutation notification that characterizes the modification and identifies the content item to which the modification is to be applied;
wherein the first content browser is further configured to send the mutation notification to the second content browser; and
wherein the second content browser is configured to (a) process the mutation notification that was generated by the mutation observer executing on the first content browser, and (b) in response to processing the mutation notification, modify an appearance of the second tile as displayed on the second display device based on the mutation notification.

10. The system of claim 9, wherein:
the content item is a webpage encoded using a hypertext markup language.

11. The system of claim 9, wherein:
the content item is a webpage; and
the first and second content browsers are configured to receive the webpage from a content server.

12. The system of claim 9, wherein:
the first tile of the content item is defined by a display configuration; and
the first content browser is further configured to receive the display configuration from a configuration manager.

13. The system of claim 9, further comprising a configuration manager configured to receive first and second display configurations that define the first and second tiles, respectively.

14. The system of claim 9, wherein:
the content item is a webpage encoded using a hypertext markup language; and
the mutation notification defines coordinates for a cascading style sheet (CSS) translation.

15. A non-transitory computer readable medium having instructions encoded thereon that, when executed by one or more processors, causes a digital content rendering process to be carried out, the process comprising:
logically subdividing a content item into a plurality of tiles, wherein a document object model defines a structural aspect of the content item;
rendering the content item using a composite display that comprises a plurality of display devices, wherein a first browser window provided on a first display device displays a first tile of the content item, wherein a second browser window provided on a second display device displays a second tile of the content item, and wherein the first and second browser windows are rendered by respective first and second content browser applications;
running a mutation observer on the first content browser application;
using the mutation observer to detect a modification to the document object model that affects an appearance of the content item in the first tile;
using the mutation observer to generate a mutation notification that characterizes the detected modification and identifies the content item to which the detected modification applies;

sending the mutation notification from the first content browser application to the second content browser application;

using the second content browser application to process the mutation notification that was generated by the mutation observer; and further using the second content browser application to modify an appearance of the content item in the second tile in response to processing the mutation notification.

16. The non-transitory computer readable medium of claim 15, wherein the digital content rendering process further comprises:

receiving, via the first browser window, a first display configuration that defines the first tile and a second display configuration that defines the second tile; and transmitting the second display configuration to the second display device.

17. The non-transitory computer readable medium of claim 15, wherein:

the first display device includes a touch sensitive surface; and detecting the modification further comprises detecting a scrolling gesture made using the touch sensitive surface.

18. The non-transitory computer readable medium of claim 15, wherein the digital content rendering process further comprises sending the mutation notification from a first computing device that is executing the first content browser application to a second computing device that is executing the second content browser application.

19. The non-transitory computer readable medium of claim 15, wherein:

the digital content rendering process further comprises sending the mutation notification from a first computing device that is executing the first content browser application to a second computing device that is executing the second content browser application; and the mutation notification is sent via a peer-to-peer communication directly from the first computing device to the second computing device.

20. The non-transitory computer readable medium of claim 15, wherein:

the digital content rendering process further comprises sending the mutation notification from a first computing device that is executing the first content browser application to a second computing device that is executing the second content browser application;

the mutation notification is sent from the first computing device to a server; and the mutation notification is sent from the server to the second computing device.

* * * * *